US012698406B2

(12) United States Patent
Kandapallil et al.

(10) Patent No.: US 12,698,406 B2
(45) Date of Patent: Aug. 4, 2026

(54) COMPOSITIONS AND METHODS FOR DEPOSITION OF ULTRATHIN NANOPARTICLE FILMS

(71) Applicant: The Boeing Company, Arlington, VA (US)

(72) Inventors: Binil Itty Ipe Kandapallil, Long Beach, CA (US); Siji Thomas, Long Beach, CA (US); Juliana Sanoe Tampus, Tustin, CA (US); Phillip Charles Reid, Santa Ana, CA (US); Timothy R. Kilgore, Orange, CA (US); John Gerhard Keller, Rancho Palos Verdes, CA (US)

(73) Assignee: The Boeing Company, Arlington, VA (US)

( * ) Notice: Subject to any disclaimer, the term of this patent is extended or adjusted under 35 U.S.C. 154(b) by 552 days.

(21) Appl. No.: 18/319,755

(22) Filed: May 18, 2023

(65) Prior Publication Data

US 2024/0384113 A1      Nov. 21, 2024

(51) Int. Cl.
| | |
|---|---|
| *C09K 11/02* | (2006.01) |
| *C09D 1/00* | (2006.01) |
| *C09D 5/22* | (2006.01) |
| *C09D 7/40* | (2018.01) |
| *C09D 11/037* | (2014.01) |
| *C09D 11/50* | (2014.01) |
| *C09D 11/54* | (2014.01) |

(52) U.S. Cl.
CPC ................. *C09D 5/22* (2013.01); *C09D 1/00* (2013.01); *C09D 7/67* (2018.01); *C09D 7/68* (2018.01); *C09D 11/037* (2013.01); *C09D 11/50* (2013.01); *C09D 11/54* (2013.01)

(58) Field of Classification Search
CPC ... C09D 5/22; C09D 7/67; C09D 7/68; C09D 11/02; C09D 11/50; C09D 11/54; C23C 18/127; C23C 18/1216; C09K 11/02; C09K 11/025; C01G 23/053
See application file for complete search history.

(56) References Cited

U.S. PATENT DOCUMENTS

| | | | |
|---|---|---|---|
| 11,360,250 B1 * | 6/2022 | Guo ..................... | C01G 15/006 |
| 2011/0312080 A1 | 12/2011 | Hatton et al. | |
| 2017/0247551 A1 | 8/2017 | Li et al. | |

OTHER PUBLICATIONS

Dey, A., et al., "Enhanced Charge Carrier Generation by Dielectric Nanomaterials for Quantum Dots Solar Cells Based on CdS—TiO2 Photoanode," Solar Energy, vol. 158, 2017, pp. 83-88.
Extended European Search Report for European Application No. EP241760537 dated Oct. 14, 2024, 7 pages.
Shamsi, J., et al., "Metal Halide Perovskite Nanocrystals: Synthesis, Post-Synthesis Modifications, and Their Optical Properties," Chemical Reviews, Vo. 119(5), 2020, pp. 1-57.

* cited by examiner

*Primary Examiner* — Matthew E. Hoban
*Assistant Examiner* — Lynne Edmondson
(74) *Attorney, Agent, or Firm* — Harrity & Harrity, LLP

(57) ABSTRACT

Compositions for deposition of ultrathin layers of nanoparticle films are provided. Ultrathin nanoparticle films and methods for deposition thereof involving applying the nanoparticle-metal alkoxide solution to a substrate, such that a formed metal oxide is anchored on a surface of the substrate to form an ultrathin nanoparticle film are also provided.

20 Claims, 4 Drawing Sheets
(3 of 4 Drawing Sheet(s) Filed in Color)

Scheme 2

Scheme 1

Scheme 2

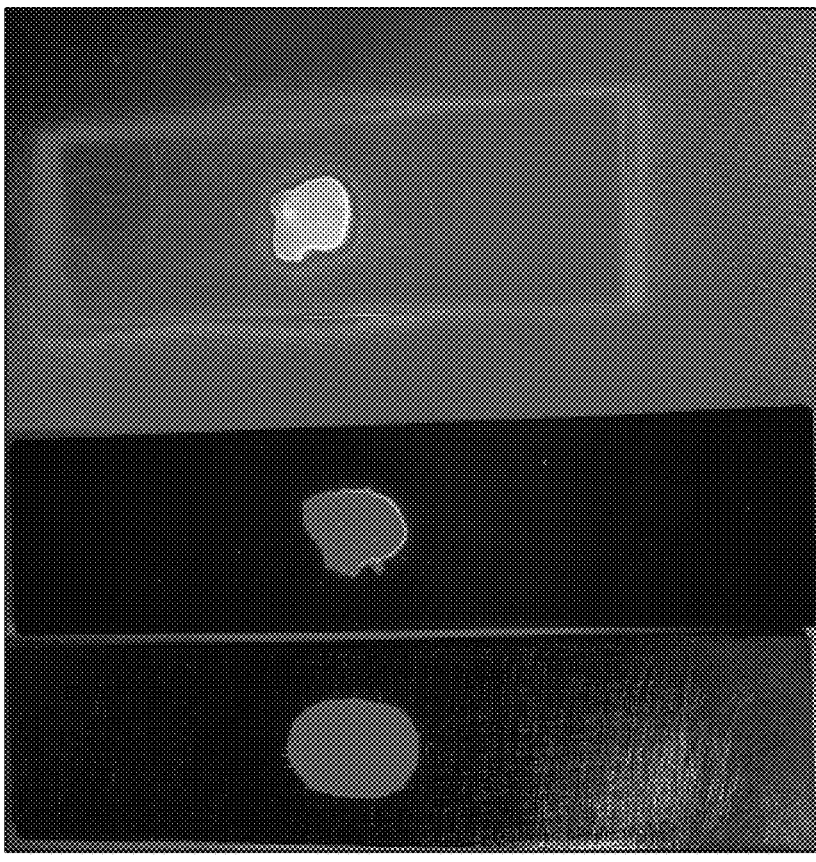
FIG. 4A
FIG. 4B
FIG. 4C
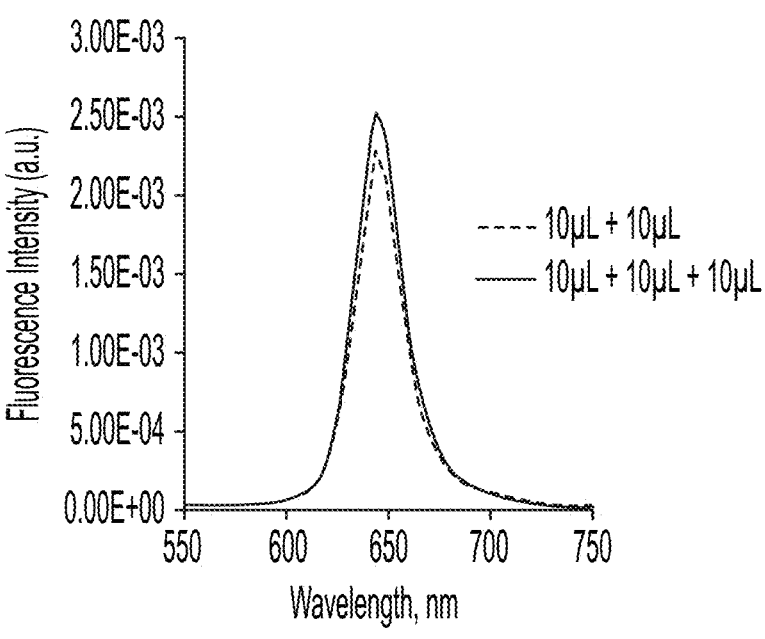
FIG. 5

COMPOSITIONS AND METHODS FOR DEPOSITION OF ULTRATHIN NANOPARTICLE FILMS

TECHNICAL FIELD

The present disclosure generally relates to methods and compositions for deposition of ultrathin layers of nanoparticle films.

BACKGROUND

Nanoparticle thin films are gaining significant attention because of their potential use in sensors, displays, and energy storage. Commonly used methods for fabrication of nanoparticle thin films include spray, dip-coating, transfer printing, etc. These methods provide insufficient control of the packing density on the surface of the substrate. There are more sophisticated techniques for nanoparticle deposition like chemical vapor and atomic layer deposition which are expensive, and limited by the size, shape, and type of substrates. There is a relatively cheaper, multistep Langmuir-Blodgett deposition method, which is also limited by the shape and size of the substrate surface. Hence a simple, inexpensive, and universal method without the need for sophisticated instrumentation techniques for the deposition of nanoparticles would be beneficial to the industry. The unique and stable fluorescence properties of nanoparticles such as quantum dots (QDs), make them ideal as pigments for large-area displays, sensors, and imaging. Most of these applications require QDs in the form of thin films. Fabrication of QD thin films without aggregation and subsequent fluorescence quenching is challenging and expensive.

SUMMARY

This section provides a general summary of the disclosure and is not a comprehensive disclosure of its full scope or all of its features.

In various aspects, the present teachings provide a composition comprising nanoparticles dispersed in a metal alkoxide solution, wherein the metal alkoxide solution comprises a transition metal alkoxide precursor and an anhydrous solvent, wherein the transition metal alkoxide precursor is in an amount effective to anchor a formed metal oxide on a surface of a substrate and to form a nanoparticle film.

In another aspect, the present disclosure provides a method for forming a nanoparticle film. The method comprises preparing a metal alkoxide solution comprising a predetermined amount of a transition metal alkoxide precursor in a solvent; mixing pre-dried nanoparticles with the metal alkoxide solution to obtain a nanoparticle-metal alkoxide solution; and applying the nanoparticle-metal alkoxide solution to a substrate, such that a formed metal oxide is anchored on a surface of the substrate, thereby forming a nanoparticle film.

In the compositions and methods of the present disclosure, the nanoparticles have a size within a range of 1-500 nm. The nanoparticles include metal nanoparticles, metal oxide nanoparticles, carbon nanoparticles, or semiconductor nanoparticles. The nanoparticles may also include anisotropic nanomaterials. In some examples, the nanoparticles are quantum dots.

In some examples, the amount of the transition metal alkoxide precursor is between 5%-90% by volume. The transition metal alkoxide precursor may comprise a transition metal selected from the group consisting of Co, Ga, Ge, Hf, Fe, Ni, Nb, Mo, La, Re, Sc, Si, Ti, Ta, V, W, Y, Zr, and Sc. In some examples of the present disclosure, the transition metal alkoxide precursor comprises titanium butoxide, titanium tert-butoxide, titanium isopropoxide, titanium ethoxide, titanium methoxide, zirconium ethoxide, zirconium butoxide, zirconium tert-butoxide, zirconium propoxide, vanadium oxytriethoxide, vanadium oxytripropoxide, vanadium oxytriisopropoxide, vanadium tert-butoxide, or tantalum ethoxide, tantalum butoxide. In other examples, the transition metal alkoxide precursor is titanium butoxide, titanium ethoxide, zirconium butoxide. The solvent in the compositions and methods of the present disclosure may be in an amount of from 10-95% by weight.

Further areas of applicability and various methods of enhancing the above technology will become apparent from the description provided herein. The description and specific examples in this summary are intended for purposes of illustration only and are not intended to limit the scope of the present disclosure.

BRIEF DESCRIPTION OF DRAWINGS

The patent or application file contains at least one drawing executed in color. Copies of this patent or patent application publication with color drawing(s) will be provided by the Office upon request and payment of the necessary fee.

The present teachings will become more fully understood from the detailed description and the accompanying drawings wherein:

FIGS. 4A-4C is a demonstration of illumination of QDs (10 μL) applied onto glass (4A), primer coated Al (4B), and bare Al (4C).

FIG. 5 is a graphic illustration of the comparison of fluorescence intensity and radiance from different volumes of QDs applied on titanium alkoxide-treated aluminum substrate.

Figure 1:
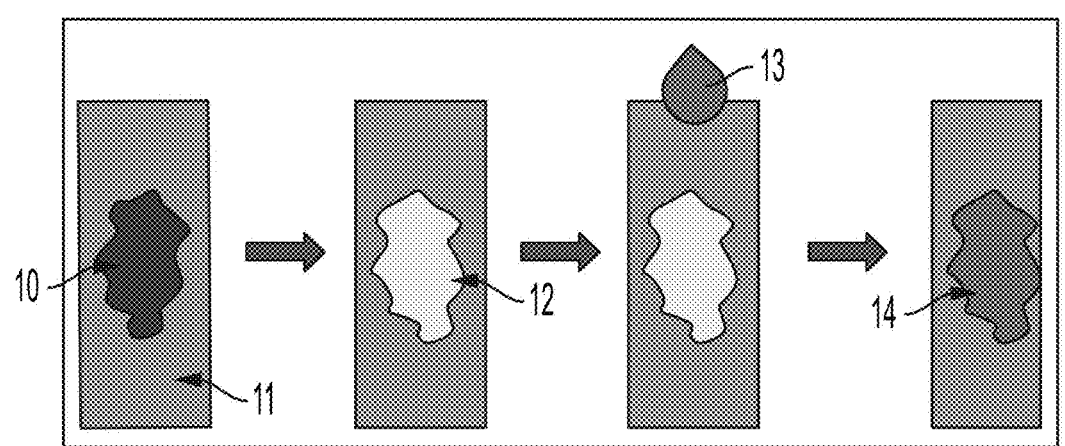
FIG. 1 is an illustration of method of QD film deposition on a preformed metal oxide pattern (Scheme 1).

It should be noted that the Figures set forth herein are intended to exemplify the general characteristics of the methods, algorithms, and devices among those of the present technology, for the purpose of the description of certain aspects. These figures may not precisely reflect the characteristics of any given aspect and are not necessarily intended to define or limit specific embodiments within the scope of this technology. Further, certain aspects may incorporate features from a combination of figures.

DESCRIPTION

The present disclosure provides a simple, inexpensive chemical technique applicable for the assembly of nanoparticles on a wide range of common substrates like metal, metal oxide, and composites. The compositions and methods of the present disclosure can be used for deposition of ultrathin nanoparticle films for large area applications. The composition comprises nanoparticles, metal alkoxide, and suitable solvents. A metal alkoxide applied on a surface forms a 3-D metal oxide network on the surface upon hydrolysis and condensation under ambient conditions.

The composition of the present disclosure comprises nanoparticles, which are dispersed in a metal alkoxide solution. Nanoparticles are extremely small particles have a diameter in the range of 1-500 nm. In some examples, the nanoparticles have a diameter in the range of 1-300 nm, 1-100 nm, 1-50 nm, 1-20 nm, less than 10 nm, or less than 5 nm. Because of their small size, nanoparticles have unique optical, electronic, and mechanical properties compared to their corresponding bulk material. The term "nanoparticles" as used in the present disclosure includes, nanoparticles (NP), nanocrystals (NC), and semiconductor particles, such as quantum dots. Examples of nanoparticles include compositions of metals; metal oxides, hydroxides, sulfides, phosphates, fluorides, and chlorides; carbon nanoparticles; and semiconductor nanoparticles. Nanoparticles of the present disclosure also includes anisotropic nanomaterials.

Examples of metal nanoparticles include but are not limited to gold, silver, platinum, titanium, zinc, cerium, iron, and thallium. Examples of metal oxide nanoparticles, include but are not limited to iron oxide ($Fe_2O_3$), titanium oxide ($TiO_2$), vanadium oxide ($VO_2$), tantalum oxide ($Ta_2O_5$), and zirconium oxide ($ZrO_2$).

Semiconductor nanoparticles, also referred to as nanocrystals, are made from a variety of different compounds. They are referred to as II-VI, III-V, or IV-VI semiconductor nanoparticles, based on the periodic table groups into which these elements are categorized. Germanium, tin and lead are group IV elements with PbSe, PbS, PbTe as IV-VI semiconductor examples, GaN, GaP, GaAs, InP and InAs are III-V examples, while those of ZnO, ZnS, CdS, CdSe and CdTe are II-VI semiconductors. Thus, examples of semiconductor nanoparticles include, but are not limited to, gallium nitride (GaN), gallinium phosphide (GaP), gallinium arsenide (GaAs), indium phosphide (InP), indium arsenide (InAs) from group III-V, zinc oxide (ZnO), zinc sulfide (ZnS), cadmium sulfide (CdS), cadmium selenide (CdSe), cadmium tellenium (CdTe) are II-VI semiconductors, and lead selenide (PbSe), lead sulfide (PbS), lead telluride (PbTe), tin telluride (SnTe), tin sulfide (SnS) are from group IV-VI. Semiconductor nanoparticles can also have a core/shell structure such as cadmium selenium zinc sulfide (CdSeZnS), cadmium sulfide zinc sulfide (CdSZnS), indium arsenide zinc selenide (InAsZnSe) nanoparticles.

Nanoparticles of the present disclosure also include materials of diverse shape in the nanoscale regime, such as anisotropic nanomaterials. The term "anisotropic nanomaterials" refers to a class of materials in which their properties are direction-dependent and more than one structural parameter is needed to describe them. Anisotropic materials are categorized based on dimensionality as 1-, 2-, and 3D nanostructures. Anisotropic materials, include but are not limited to nanoparticles with a variety of shapes, encompassing one-dimensional nanorods, nanowires, and nanotubes; two-dimensional plates, sheets, and ribbons; and three-dimensional pyraminds, stars, flowers, multi-pods, nanourchins, tadpoles, nanocages, nanorice, nanocorns, nanoboxes, nanocubes, triangular nanoframes, nano dumbbells, platelets, rings, polyhedra, and the like.

In some examples of the present disclosure, the nanoparticles are semiconductor nanoparticles called quantum dots. When the size of semiconductor materials is reduced to nanoscale, such as in quantum dots, their physical and chemical properties change drastically, resulting in unique properties due to their large surface area or quantum size effect. Quantum dots have a particle diameter in the range of 2-10 nm, or more preferably 1-5 nm. Quantum dots are extremely photo-stable and have a very narrow emission spectrum in the UV-Vis-NIR spectral window. For example, QDs composed of II-IV semiconductors emit light in the visible spectral region and their wavelength can be tuned by optimizing the corresponding nanoparticle size. Unlike organic fluorescent dyes, QDs have high absorption cross section, high quantum yield, high photostability and narrow emission bands. Within the scope of the present disclosure, it is possible to incorporate differently sized QDs in an array and create patterns that can be uniquely utilized for multiplexed imaging.

The metal alkoxide solution of the present disclosure comprises a transition metal alkoxide precursor and a solvent, wherein the transition metal alkoxide precursor is in an amount effective to anchor a formed metal oxide on a surface of a substrate and to form a nanoparticle film. In some examples, the amount of the transition metal alkoxide precursor is between 5%-90% by volume. In some examples the effective amount is 10%-80% by volume, 10%-20% by volume, or about 10% by volume.

The deposited nanoparticle film of the present disclosure is ultrathin, which means that it has a coating thickness of not more than 100-200 μm. The minimum film thickness may be limited by the dimension of the nanomaterial involved, such as anisotropic nanomaterials. Typically, the thickness imparted by the metal alkoxide is in the molecular size range (angstroms). However, the ultrathin film of the present disclosure is achieved by minimizing the concentration of the metal alkoxide and maximizing the amount of the solvent. By controlling the film thickness, the properties of the deposited nanoparticle film can be optimized. For example, the penetration depth of the excitation light source and therefore the optical properties of a fluorescent film can be controlled by controlling film thickness.

Ultrathin nanoparticle films of the present disclosure can be achieved by either applying a nanoparticle solution onto a preformed metal oxide network (Nanopatterning (Method 1)) or by pre-dispersing nanoparticles with metal alkoxide prior to deposition on a surface (Predispersion (Method 2)).

Method 1: Nanopatterning Method

In the nanopatterning method, the surface of the substrate upon which the nanoparticle will be dispersed is pretreated with a transition metal alkoxide (e.g., titanium, zirconium, etc.) under ambient conditions (e.g., 60-70° F. and 30-70% RH). The hydroxyl groups on the surface of the substrate react with the metal alkoxide forming a covalent bond between the metal alkoxide and the surface, thereby anchoring the metal alkoxide to the surface of the substrate. The anchored metal alkoxide upon further self-condensation forms a 3-D metal oxide film on the substrate surface. The size and density of this resulting nanopattern can be tuned by adjusting the transition metal alkoxide concentration and relative humidity conditions. The concentration of the metal alkoxide can be adjusted by diluting the metal alkoxide in an anhydrous solvent (e.g., isopropyl alcohol, benzyl alcohol, tert-butanol, and their combinations). A nanoparticle solution (metal, semiconductor, metal oxide, carbon, etc.) dispersed in a suitable solvent like toluene, tetrahydrofuran, or hexane is applied onto the metal oxide nanopattern to achieve a uniform distribution of the nanoparticles. An illustration of this process using quantum dots is shown in (Scheme 1) in FIG. 1.

For example, the surface of the substrate on which the metal alkoxide is to be applied, may be abraded, and cleaned with a suitable solvent such as acetone to remove contaminants because contaminants would lead to non-uniform surface modification. Referring to FIG. 1, a metal alkoxide solution is prepared by diluting the metal alkoxide precursor in a suitable solvent to the desired volume and concentration. The metal alkoxide solution 10 is applied onto the substrate 11 in step (1) and allowed to evaporate under ambient conditions in step (2) forming a metal alkoxide-treated surface 12. The metal alkoxide solution can be applied to the substrate using known methods. In some examples, the solution is applied by drop casting, spray coating, dip coating transfer printing, chemical vapor deposition (CVD), and atomic layer deposition. In step (3), after the solvent completely evaporates, a suitable amount of a QD solution 13 is applied on the metal alkoxide-treated surface 12. The QD solution can be applied to the metal-alkoxide treated surface by known methods such as drop casting, pipetting, or inkjet printing. By this method, in step (4), the QD solution 13 spreads evenly and readily onto the alkoxide-treated surface of the substrate, resulting in more uniform distribution, and exhibiting good optical properties of the ultrathin nanoparticle film 14 formed.

Method 2: Predispersion Method

In the predispersion method of the present disclosure, a solution containing nanoparticles and a transition metal alkoxide is premixed prior to application onto the surface of the substrate. The concentration of metal alkoxide strongly influences the thickness of the resulting nanoparticle film. In this method, a suitable volume of the nanoparticle is evaporated under reduced pressure to remove the carrier solvent. The transition metal alkoxide is diluted with a known amount of a suitable solvent, e.g., toluene. The solvent used for diluting the metal alkoxide should be compatible with the desired nanoparticle. The diluted transition metal alkoxide solution is used for redispersing the pre-dried nanoparticles. The nanoparticle-metal alkoxide solution can be applied on a substrate to form the nanoparticle film. A cartoon representation of film formation through nanoparticle dispersion in metal alkoxide is shown in FIG. 2.

Figure 2:
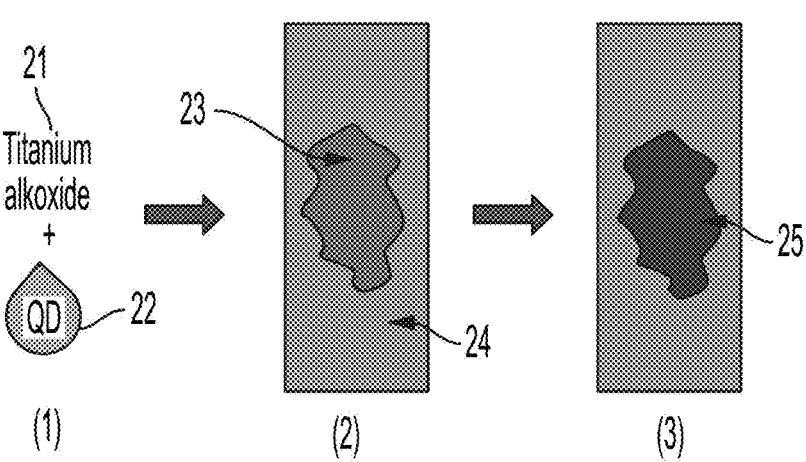
FIG. 2 is an illustration of QD film formation after premixing with a metal alkoxide solution (Scheme 2).

For example, as illustrated in Scheme 2 in FIG. 2, the method for forming a nanoparticle film of the present disclosure comprises, in step (1) preparing a metal alkoxide solution comprising a predetermined amount of a transition metal alkoxide precursor in a solvent forming a metal alkoxide solution 21 and mixing pre-dried nanoparticles 22 with the metal alkoxide solution 21 to obtain a nanoparticle-metal alkoxide solution 23. In step (2) the nanoparticle-metal alkoxide solution 23 is applied to a substrate 24 by known application techniques, such as drop casting, such that, in step (3), a formed metal oxide is anchored on a surface of the substrate 24, thereby forming a nanoparticle film 25.

The mechanism of film formation and attachment is due to hydrolysis and condensation reactions of the metal alkoxide. These reactions can be described as follows:

Hydrolysis: $M\text{-}(OR)_n + H_2O \rightarrow M\text{-}(OR)_{n-1}OH + ROH$

Condensation: $M\text{-}(OR)_{n-1}\text{-}OH + RO\text{-}M \rightarrow M\text{-}(OR)_{n-1}\text{—}O\text{-}M + ROH;$ wherein M is a transition metal; and R is an alkyl group.

Transition metals used to form the transition metal alkoxide precursors include elements in the d-block of the periodic table. Examples of transition metals used to form the transition metal alkoxide precursors, include but are not limited to Co, Ga, Ge, Hf, Fe, Ni, Nb, Mo, La, Re, Sc, Si, Ti, Ta, V, W, Y, Zr, and Sc. Transition elements form coordination complexes by bonding with different kinds of ligands. Transition elements like titanium, zirconium, etc. form alkoxides upon binding with alcohols. These metal alkoxides are very sensitive to humidity and they hydrolyze to form the corresponding metal oxide and alcohol. Examples of metal oxides that may be formed include, but are not limited to cobalt oxide ($CO_2O_3$,), gallium oxide ($Ga_2O_3$), geranium oxide ($GeO_2$), hafnium oxide ($HfO_2$), iron oxide ($Fe_2O_3$), nickel oxide ($NiO_2$), niobium oxide ($Nb_2O_5$), molybdenum oxide ($Mo_2O_3$), lanthanum oxide ($La_2O_3$), rhenium oxide ($Re_2O_3$), scandium oxide ($Sc_2O_3$), silicon oxide ($SiO_2$), titanium oxide ($TiO_2$), tantalum oxide ($Ta_2O_5$), vanadium oxide ($VO_2$), tungsten oxide ($WO_2$), yttrium oxide ($Y_2O_3$), zirconium dioxide ($ZrO_2$), and scandinium oxide ($Sc_2O_3$). In some examples, the metal oxide formed is iron oxide ($Fe_2O_3$), tantalum oxide ($Ta_2O_5$), titanium dioxide ($TiO_2$), vanadium dioxide ($VO_2$), or zirconium dioxide ($ZrO_2$).

R represents alkyl groups, which include but are not limited to straight chain, branched, and cyclic alkyl groups having 1-8 carbon atoms.

The amount of the transition metal alkoxide precursor effective to anchor a formed metal oxide on a surface of a substrate and to form a nanoparticle film is between 5%-90% by volume. In some examples the effective amount is 10%-80% by volume, 10%-20% by volume, or about 10% by volume.

The solvents to be used in the present disclosure are anhydrous solvents including polar, and nonpolar solvents. Examples of polar solvents include, but are not limited to dioxanes, such as 1,4-dioxane; alcohols such as methanol, ethanol, 1-propanol, isopropanol, butanol, tert-butyl alcohol, 1,4-butanediol, and benzyl alcohol and combinations thereof; nitriles, such as acetonitrile; acetone; organohalides, such as dichloromethane; amides, such as N,N-dimethyl formamide; sulfoxides, such as dimethyl sulfoxide; and esters such as ethyl acetate. Examples of non-polar solvents include but are not limited to hydrocarbons, such as methane, ethane, propane, butane, pentane, hexane, heptane; toluene, tetrahydrofuran; symmetrical ethers, such as diethyl ether; esters such as ethyl acetate; and aromatic hydrocarbons, such as benzene, toluene.

The amount of solvent in the system of the present disclosure ranges from about 10 to about 99.5%. In some examples the solvent amount is 10%-99% by volume, 10%-90% by volume. The amount of the solvent in proportion to the system determines the size and hence the thickness of the resulting metal oxide film upon hydrolysis. A dilute sample of the metal alkoxide produces smaller metal oxide particles resulting in thin nanoparticle films.

The nanoparticle film is formed due to hydrolysis and/or condensation reactions. Since metal alkoxide readily undergoes hydrolysis in the presence of moisture, any surface with a hydroxyl functional group would facilitate adhesion of the composition of the present disclosure. Hence substrates with high surface energy are most preferred. There are a number of surface treatment methods like sanding, plasma treatments, corona treatments, laser treatments, and chemical treatments to increase wettability. Exemplary substrates include, but are not limited to aluminum, glass, and thermoplastic composites.

EXAMPLES

Various aspects of the present disclosure are further illustrated with respect to the following examples. It is to be understood that these examples are provided to illustrate specific embodiments of the present disclosure and should not be construed as limiting the scope of the present disclosure in or to any particular aspect.

Nanopatterning Example 1

Figure 3A:
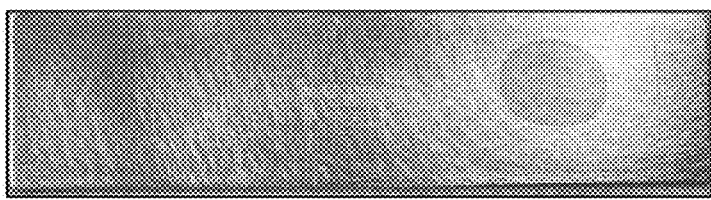
FIGS. 3A-3D show the distribution of green and red QDs (10 μL) on an aluminum substrate treated with titanium butoxide (3A, 3B) and without titanium butoxide (3C, 3D), where images 3A and 3C were recorded under white light, and images 3B and 3D were recorded under 365 nm long pass light.
Figure 3B:
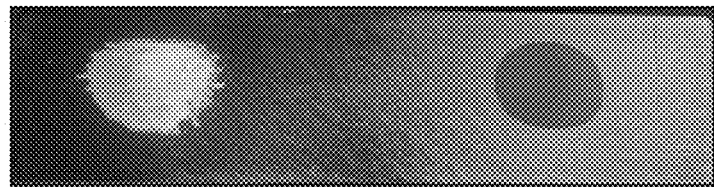

A nanoparticle film was formed with red and green quantum dots on an aluminum substrate treated with titanium butoxide. After cleaning with acetone to remove any organic contaminants, the aluminum substrate was abraded with 150 grit sandpaper. A solution of titanium (IV) butoxide was prepared by diluting the titanium (IV) butoxide in isopropyl alcohol to the desired volume (5 mL) and concentration (0.1% v/v). The metal alkoxide solution was applied by drop casting onto the substrate and allowed to evaporate under ambient conditions (70° F. and 52% RH). After the solvent completely evaporated, 10 μL of red and green QDs each were applied by drop casting on the metal alkoxide treated surface (FIGS. 3A and 3B). The image of FIG. 3A was recorded under white light and the image of FIG. 3B was recorded under 365 nm "long pass light".

Nanopatterning Example 2

Figure 3C:
Figure 3D:
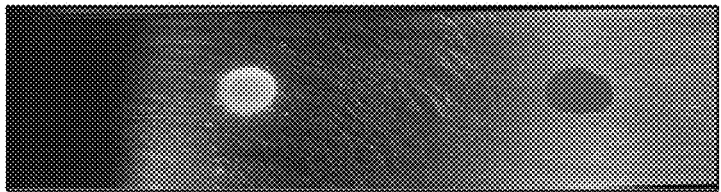

Ultrathin nanoparticle films were formed with red and green quantum dots on an aluminum substrate following the same method of Example 1, except that the aluminum substrate was not treated with titanium butoxide (FIGS. 3C and 3D). The image of FIG. 3C was recorded under white light and the image of FIG. 3D was recorded under 365 nm long pass light.

From a comparison of FIGS. 3A and 3B to FIGS. 3C and 3D, respectively, it can be seen that the QDs on the metal alkoxide treated surface spread more uniformly and to a larger area compared to the untreated substrate. The metal alkoxide pattern essentially reduces the surface energy of the substrate allowing the QD solution to wet the surface easily.

Nanopatterning Example 3

Nanoparticle films were prepared according to Example 1 and applied to a glass plate (FIG. 4A), an epoxy primer aluminum substrate (FIG. 4B), and a bare aluminum substrate (FIG. 4C). The quantum dots spread uniformly and to a similar area size on each of the different substrates, demonstrating that the nanopatterning process is suitable for various substrates.

Nanopatterning Example 4

Nanoparticle films were applied to a titanium butoxide treated aluminum substrate as in Example 1. Volumes of the QDs were applied in increasing amounts, of 10 μL+10 μL (Sample 1), and 10 μL+10 μL+10 μL (Sample 2), and the fluorescence intensity and radiance were measured. The measurements are provided in the following Table. A comparison of the fluorescence intensity and radiance when excited with 405 nm LED light source at the different volumes of QDs is shown in FIG. 5.

| Sample | Volume | Radiance (W/m²/sr/nm) |
|---|---|---|
| 1 | 10 μL + 10 μL | 1.02 |
| 2 | 10 μL + 10 μL + 10 μL | 1.01 |

As can be seen from the Table above, and FIG. 5, the radiance and fluorescence intensity did not increase significantly with increasing QD volumes. This indicates that the surface was already saturated with a layer of QDs and the radiance of the layer is limited by the quantum yield (φ) of the QD used. Quantum yield (φ) is defined as the ratio of the number of photons emitted to the number of photons absorbed and describes how efficiently a fluorophore coverts the excitation light into fluorescence.

Predispersion Example 5

Figures 6A, 6B, 6C:
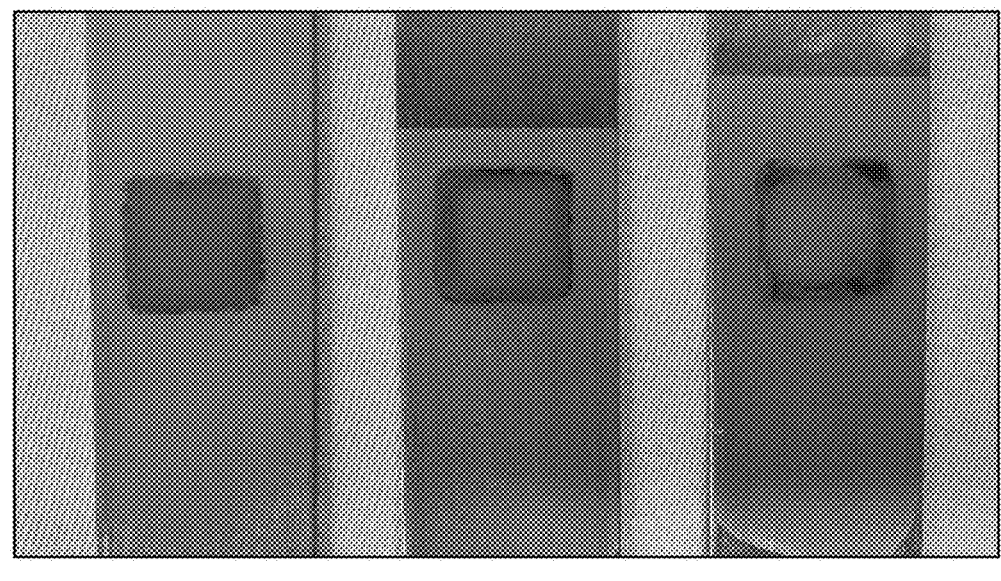
FIGS. 6A-6C show representative examples of QD films prepared using titanium butoxide at 3 different concentrations (10%, 20%, and 80% w/v).

In this method, a solution containing QDs and titanium butoxide was premixed. 1 mL of the QDs (5 mg/mL) as provided by the supplier in toluene was evaporated under reduced pressure using a rotary evaporator to remove the carrier solvent. The titanium butoxide was diluted with toluene at 10% w/v, 20% w/v, and 80% w/v, and the diluted titanium butoxide solution was used for redispersing the pre-dried QD's. The solution containing QDs dispersed in titanium butoxide in a concentration of 10% w/v, 20% w/v, and 80% w/v was applied via drop casting to the surface of an aluminum substrate to form the nanoparticle film. The QD films prepared using titanium butoxide at 10% w/v, 20% w/v, and 80% w/v, are shown in FIGS. 6A, 6B, and 6C, respectively. The uniformity of the QD film is best at 10% w/v. By varying the alkoxide concentration and the type of alkoxide, it is possible to optimize the kinetics of the film formation. This in turn determines the size of the metal oxide particles, and the resulting film thickness.

Figure 7:
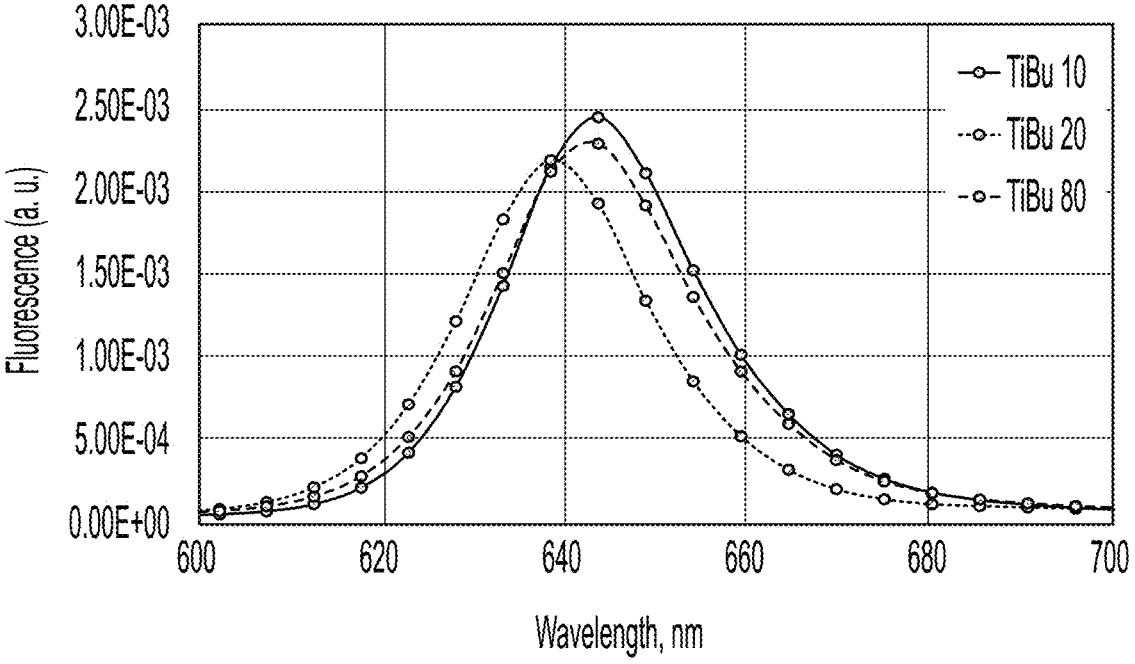
FIG. 7 is a graphical illustration of a comparison of fluorescence measured from QD films formed from different concentrations of titanium butoxide after illumination with 405 nm light.

The fluorescence measured from the samples of Example 5 after illumination with 405 nm LED light source is shown in FIG. 7. There was no notable effect on the fluorescence intensity for the relative concentration of the metal oxide formed.

Additional Notes and Examples

Further, the disclosure comprises additional notes and examples as detailed in the following clauses set forth below.

Clause 1. A composition comprising nanoparticles dispersed in a metal alkoxide solution, wherein the metal alkoxide solution comprises a transition metal alkoxide precursor, and a solvent, wherein the transition metal alkoxide precursor is in an amount effective to anchor a formed metal oxide on a surface of a substrate and to form a nanoparticle film.

Clause 2. The composition according to clause 1, wherein the nanoparticles have a diameter within the range of 1-500 nm.

Clause 3. The composition according to clause 1 or 2, wherein the nanoparticles have a diameter within the range of 1-300 nm.

Clause 4. The composition according to any one of clauses 1-3, wherein the nanoparticles have a diameter within the range of 1-300 nm.

Clause 5. The composition according to any one of clauses 1-4, wherein the nanoparticles have a diameter within the range of 1-50 nm.

Clause 6. The composition according to any one of clauses 1-5, wherein the nanoparticles have a diameter within the range of 1-20 nm.

Clause 7. The composition according to any one of clauses 1-6, wherein the nanoparticles have a diameter within the range of 2-10 nm.

Clause 8. The composition according to any one of clauses 1-7, wherein the nanoparticles have a diameter within the range of less than 10 nm.

Clause 9. The composition according to any one of clauses 1-8, wherein the nanoparticles have a diameter within the range of less than 5 nm.

Clause 10. The composition according to any one of clauses 1-9, wherein the nanoparticles are metal particles, metal oxide nanoparticles, carbon nanoparticles, or semiconductor nanoparticles.

Clause 11. The composition according to any one of clauses 1-10, wherein the nanoparticles are anisotropic nanomaterials.

Clause 12. The composition according to clause 11, wherein the anisotropic nanomaterials have a shape of nanorods, nanowires, nanotubes, plates, sheets, ribbons, pyramids, stars, flowers, multi-pods, nanourchins, tadpoles, nanocages, nanorice, nanocorns, nanoboxes, nanocubes, triangular nanoframes, nano dumbbells, platelets, rings, or polyhedra.

Clause 13. The composition according to any one of claims 1-12, wherein the nanoparticles are quantum dots.

Clause 14. The composition according to any one of clauses 1-13, wherein the amount of the transition metal alkoxide precursor is between 5%-90% by volume.

Clause 15. The composition according to clause 14, wherein the amount of the transition metal alkoxide precursor is between 10%-80% by volume.

Clause 16. The composition according to clause 14, wherein the amount of the transition metal alkoxide precursor is between 10%-20% by volume.

Clause 17. The composition according to clause 14, wherein the amount of the transition metal alkoxide precursor is about 10% by volume.

Clause 18. The composition according to any one of clauses 1-17, wherein the transition metal alkoxide precursor comprises a transition metal selected from the group consisting of Co, Ga, Ge, Hf, Fe, Ni, Nb, Mo, La, Re, Sc, Si, Ti, Ta, V, W, Y, Zr, and Sc.

Clause 19. The composition according to any one of clauses 1-18, wherein the transition metal alkoxide precursor comprises titanium butoxide, titanium tert-butoxide, titanium isopropoxide, titanium ethoxide, titanium methoxide, zirconium ethoxide, zirconium butoxide, zirconium tert-butoxide, zirconium propoxide, vanadium oxytriethoxide, vanadium oxytripropoxide, vanadium oxytriisopropoxide, vanadium tert-butoxide, or tantalum ethoxide, tantalum butoxide.

Clause 20. The composition according to ay one of clauses 1-19, wherein the solvent is an amount of from 10-95% by weight.

Clause 21. The composition according to clause 20, wherein the solvent is an anhydrous solvent selected from the group consisting of polar solvents, and non-polar solvents.

Clause 22. The composition according to clause 21, wherein the anhydrous solvent is a polar solvent selected from the group consisting of dioxanes, alcohols, nitriles, ketones, organohalides, amides, and sulfoxides.

Clause 23. The composition according to clause 21, wherein the anhydrous solvent a non-polar solvent selected from aliphatic hydrocarbons, symmetrical ethers, esters, and aromatic hydrocarbons.

Clause 24. The composition according to clause 21, wherein the solvent is 1,4-dioxane, methanol, ethanol, 1-propanol, isopropanol, butanol, tert-butyl alcohol, 1,4-butanediol, benzyl alcohol, acetonitrile, acetone, dichloromethane N,N-dimethyl formamide, dimethyl sulfoxide, ethyl acetate, methane, ethane, propane, butane, pentane, hexane, heptane; toluene, tetrahydrofuran; diethyl ether, ethyl acetate, pyridine, or combinations thereof.

Clause 25. The composition according to any one of clauses 1-25, wherein the substrate is a metal, a metal oxide, a composite, or glass.

Clause 26. A method for forming a nanoparticle film, said method comprising: preparing a metal alkoxide solution comprising a predetermined amount of a transition metal alkoxide precursor in a solvent; mixing pre-dried nanoparticles with the metal alkoxide solution to obtain a nanoparticle-metal alkoxide solution; and applying the nanoparticle-metal alkoxide solution to a substrate, such that a formed metal oxide is anchored on a surface of the substrate, thereby forming a nanoparticle film due to hydrolysis and condensation.

Clause 27. The method according to clause 26, wherein the nanoparticles have a size in the range of 1-500 nm.

Clause 28. The method according to clause 26 or 27, wherein the nanoparticles have a diameter within the range of 1-300 nm.

Clause 29. The method according to any one of clauses 26-28, wherein the nanoparticles have a diameter within the range of 1-300 nm.

Clause 30. The method according to any one of clauses 26-29, wherein the nanoparticles have a diameter within the range of 1-50 nm.

Clause 31. The method according to any one of clauses 26-30, wherein the nanoparticles have a diameter within the range of 1-20 nm.

Clause 32. The method according to any one of clauses 26-31, wherein the nanoparticles have a diameter within the range of 2-10 nm.

Clause 33. The method according to any one of clauses 26-32, wherein the nanoparticles have a diameter within the range of less than 10 nm.

Clause 34. The method according to any one of clauses 26-33, wherein the nanoparticles have a diameter within the range of less than 5 nm.

Clause 35. The method according to claim any one of clauses 26-34, wherein the nanoparticles are metal nanoparticles, metal oxide nanoparticles, carbon nanoparticles, or semiconductor nanoparticles.

Clause 36. The method according to any one of clauses 26-35, wherein the nanoparticles are anisotropic nanomaterials.

Clause 37. The method according to clause 36, wherein the anisotropic nanomaterials have a shape of nanorods, nanowires, nanotubes, plates, sheets, ribbons, pyramids, stars, flowers, multi-pods, nanourchins, tadpoles, nanocages, nanorice, nanocorns, nanoboxes, nanocubes, triangular nanoframes, nano dumbbells, platelets, rings, or polyhedra.

Clause 38. The method according to any one of clauses 26-37, wherein the nanoparticles are quantum dots.

Clause 39. The method according to any one of clauses 26-38, wherein the amount of the transition metal alkoxide precursor is between 5%-90% by volume.

Clause 40. The method according to clause 39, wherein the amount of the transition metal alkoxide precursor is between 10%-80% by volume.

Clause 41. The method according to clause 39, wherein the amount of the transition metal alkoxide precursor is between 10%-20% by volume.

Clause 42. The method according to clause 39, wherein the amount of the transition metal alkoxide precursor is about 10% by volume.

Clause 43. The method according to any one of clauses 26-42, wherein the transition metal alkoxide precursor comprises a transition metal selected from the group consisting of Co, Ga, Ge, Hf, Fe, Ni, Nb, Mo, La, Re, Sc, Si, Ti, Ta, V, W, Y, Zr, and Sc.

Clause 44. The method according to any one of clauses 26-43, wherein the transition metal alkoxide precursor comprises titanium butoxide, titanium tert-butoxide, titanium isopropoxide, titanium ethoxide, titanium methoxide, zirconium ethoxide, zirconium butoxide, zirconium tert-butoxide, zirconium propoxide, vanadium oxytriethoxide, vanadium oxytripropoxide, vanadium oxytriisopropoxide, vanadium tert-butoxide, or tantalum ethoxide, tantalum butoxide.

Clause 45. The method according to any one of clauses 26-44, wherein the solvent is an amount of from 10-95% by weight.

Clause 46. The method according to clause 45, wherein the solvent is an anhydrous solvent selected from the group consisting of polar solvents, and non-polar solvents.

Clause 47. The method according to clause 45, wherein the anhydrous solvent is a polar solvent selected from the group consisting of dioxanes, alcohols, nitriles, ketones, organohalides, amides, and sulfoxides.

Clause 48. The method according to clause 45, wherein the anhydrous solvent a non-polar solvent selected from aliphatic hydrocarbons, symmetrical ethers, esters, and aromatic hydrocarbons.

Clause 49. The method according to clause 45, wherein the solvent is 1,4-dioxane, methanol, ethanol, 1-propanol, isopropanol, butanol, tert-butyl alcohol, 1,4-butanediol, benzyl alcohol, acetonitrile, acetone, dichloromethane N,N-dimethyl formamide, dimethyl sulfoxide, ethyl acetate, methane, ethane, propane, butane, pentane, hexane, heptane; toluene, tetrahydrofuran; diethyl ether, ethyl acetate, pyridine, or combinations thereof.

Clause 50. The method according to any one of clauses 26-49, wherein the substrate is a metal, a metal oxide, a composite, or glass.

The preceding description is merely illustrative in nature and is in no way intended to limit the disclosure, its application, or uses. As used herein, the phrase at least one of A, B, and C should be construed to mean a logical (A or B or C), using a non-exclusive logical "or." It should be understood that the various steps within a method may be executed in different order without altering the principles of the present disclosure. Disclosure of ranges includes disclosure of all ranges and subdivided ranges within the entire range.

The headings (such as "Background" and "Summary") and sub-headings used herein are intended only for general organization of topics within the present disclosure, and are not intended to limit the disclosure of the technology or any aspect thereof. The recitation of multiple embodiments having stated features is not intended to exclude other embodiments having additional features, or other embodiments incorporating different combinations of the stated features.

As used herein, the terms "comprise" and "include" and their variants are intended to be non-limiting, such that recitation of items in succession or a list is not to the exclusion of other like items that may also be useful in the devices and methods of this technology. Similarly, the terms "can" and "may" and their variants are intended to be non-limiting, such that recitation that an embodiment can or may comprise certain elements or features does not exclude other embodiments of the present technology that do not contain those elements or features.

As used herein, the term "about", in the context of concentrations of components of the formulations, typically means+/−5% of the stated value, more typically +/−4% of the stated value, more typically +/−3% of the stated value, more typically, +/−2% of the stated value, even more typically +/−1% of the stated value, and even more typically +/−0.5% of the stated value.

The broad teachings of the present disclosure can be implemented in a variety of forms. Therefore, while this disclosure includes particular examples, the true scope of the disclosure should not be so limited since other modifications will become apparent to the skilled practitioner upon a study of the specification and the following claims. Reference herein to one aspect, or various aspects means that a particular feature, structure, or characteristic described in connection with an embodiment or particular system is included in at least one embodiment or aspect. The appearances of the phrase "in one aspect" (or variations thereof) are not necessarily referring to the same aspect or embodiment. It should be also understood that the various method steps discussed herein do not have to be carried out in the same order as depicted, and not each method step is required in each aspect or embodiment.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations should not be regarded as a departure from the disclosure, and all such modifications are intended to be included within the scope of the disclosure.

What is claimed is:

1. A composition comprising nanoparticles dispersed in a metal alkoxide solution, wherein the metal alkoxide solution comprises a transition metal alkoxide precursor and an anhydrous solvent, wherein the transition metal alkoxide precursor is in a predetermined amount to anchor a formed metal oxide on a surface of a substrate and to form a nanoparticle film, wherein the predetermined amount of the transition metal alkoxide precursor is between 5% and 90% by volume.

2. The composition according to claim 1, wherein the nanoparticles have a size within a range of 1-500 nm.

3. The composition according to claim 1, wherein the nanoparticles are metal nanoparticles, metal oxide nanoparticles, carbon nanoparticles, or semiconductor nanoparticles.

4. The composition according to claim 1, wherein the nanoparticles include anisotropic nanomaterials.

5. The composition according to claim 1, wherein the nanoparticles are quantum dots.

6. The composition according to claim 1, wherein the transition metal alkoxide precursor comprises a transition metal selected from the group consisting of Co, Ga, Ge, Hf, Fe, Ni, Nb, Mo, La, Re, Sc, Si, Ti, Ta, V, W, Y, Zr, and Sc.

7. The composition according to claim 1, wherein the transition metal alkoxide precursor comprises titanium butoxide, titanium tert-butoxide, titanium isopropoxide, titanium ethoxide, titanium methoxide, zirconium ethoxide, zirconium butoxide, zirconium tert-butoxide, zirconium propoxide, vanadium oxytriethoxide, vanadium oxytripropoxide, vanadium oxytriisopropoxide, vanadium tert-butoxide, tantalum ethoxide, or tantalum butoxide.

8. The composition according to claim 1, wherein the transition metal alkoxide precursor is titanium butoxide, titanium ethoxide, or zirconium butoxide.

9. The composition according to claim 1, wherein the anhydrous solvent is an amount from 10-95% by weight.

10. A method for forming a nanoparticle film, said method comprising:
   preparing a metal alkoxide solution comprising a predetermined amount of a transition metal alkoxide precursor in a solvent,
      wherein the predetermined amount of the transition metal alkoxide precursor is between 5% and 90% by volume;
   mixing pre-dried nanoparticles with the metal alkoxide solution to obtain a nanoparticle-metal alkoxide solution; and
   applying the nanoparticle-metal alkoxide solution to a substrate, such that a formed metal oxide is anchored on a surface of the substrate, thereby forming a nanoparticle film.

11. The method according to claim 10, wherein the nanoparticles have a size in a range of 1-500 nm.

12. The method according to claim 10, wherein the nanoparticles are metal nanoparticles, metal oxide nanoparticles, carbon nanoparticles, or semiconductor nanoparticles.

13. The method according to claim 10, wherein the nanoparticles include anisotropic nanomaterials.

14. The method according to claim 10, wherein the nanoparticles are quantum dots.

15. The method according to claim 10, wherein the transition metal alkoxide precursor comprises a transition metal selected from the group consisting of Co, Ga, Ge, Hf, Fe, Ni, Nb, Mo, La, Re, Sc, Si, Ti, Ta, V, W, Y, Zr, and Sc.

16. The method according to claim 10, wherein the transition metal alkoxide precursor comprises titanium butoxide, titanium tert-butoxide, titanium isopropoxide, titanium ethoxide, titanium methoxide, zirconium ethoxide, zirconium butoxide, zirconium tert-butoxide, zirconium propoxide, vanadium oxytriethoxide, vanadium oxytripropoxide, vanadium oxytriisopropoxide, vanadium tert-butoxide, tantalum ethoxide, or tantalum butoxide.

17. The method according to claim 10, wherein the transition metal alkoxide precursor is titanium butoxide, titanium ethoxide, or zirconium butoxide.

18. The method according to claim 10, wherein the substrate is metal, metal oxide, composite, or glass.

19. The composition according to claim 1, wherein the formed metal oxide is anchored to the surface of the substrate by a hydroxyl group on the surface of the substrate by reacting with the metal alkoxide solution to form a covalent bond between the metal alkoxide solution and the surface.

20. The method according to claim 10, wherein the formed metal oxide is anchored to the surface of the substrate by a hydroxyl group on the surface of the substrate by reacting with the metal alkoxide solution to form a covalent bond between the metal alkoxide solution and the surface.

* * * * *